(12) United States Patent
Xiong

(10) Patent No.: US 10,032,290 B2
(45) Date of Patent: Jul. 24, 2018

(54) METHOD FOR SYNTHESIZING DYNAMIC VIRTUAL FIGURES

(75) Inventor: Pu Xiong, Guangdong (CN)

(73) Assignee: TENCENT TECHNOLOGY (SHENZHEN) COMPANY LIMITED, Guangding P.R. Shenzhen (CN)

( * ) Notice: Subject to any disclaimer, the term of this patent is extended or adjusted under 35 U.S.C. 154(b) by 337 days.

(21) Appl. No.: 11/596,223

(22) PCT Filed: Jan. 6, 2005

(86) PCT No.: PCT/CN2005/000019
§ 371 (c)(1),
(2), (4) Date: Jul. 19, 2007

(87) PCT Pub. No.: WO2005/111929
PCT Pub. Date: Nov. 24, 2005

(65) Prior Publication Data
US 2007/0279410 A1 Dec. 6, 2007

(30) Foreign Application Priority Data
May 14, 2004 (CN) .......................... 2004 1 0037999

(51) Int. Cl.
*G06T 13/00* (2011.01)
*G06T 11/00* (2006.01)
(Continued)

(52) U.S. Cl.
CPC ................ *G06T 11/00* (2013.01); *G06T 1/00* (2013.01); *G06T 13/80* (2013.01); *G06T 13/00* (2013.01);
(Continued)

(58) Field of Classification Search
CPC ......... G06T 13/40; G06T 13/00; G06T 13/80; G06T 13/20; G06T 11/00; G06T 1/00; G06T 2210/32; A63F 13/10
(Continued)

(56) References Cited

U.S. PATENT DOCUMENTS 6,137,483 A * 10/2000 Kiyono et al. ................. 715/234
6,211,881 B1 * 4/2001 Gabler et al. .................. 345/418
(Continued)

FOREIGN PATENT DOCUMENTS

| CN | 1389817 | 1/2003 |
|---|---|---|
| CN | 1453719 | 11/2003 |

(Continued)

OTHER PUBLICATIONS

Indian Office Action for Indian Application No. 4576/CHENP/2006, dated Dec. 16, 2009.
(Continued)

*Primary Examiner* — Abderrahim Merouan
(74) *Attorney, Agent, or Firm* — Sughrue Mion, PLLC

(57) ABSTRACT

The invention discloses a method for synthesizing dynamic virtual figure, including: a synthesis server end receives a user request sent by a user and, according to information of the user request, obtains image files of all the components for synthesizing the required virtual figure; reading the corresponding image files of a component one by one according to layer numbers and transforming obtained component image files into a prescribed format; synthesizing the formatted component and previously synthesized middle figure; judging whether all components are synthesized, if all components are synthesized, writing the synthesized virtual figure into a virtual figure image file; otherwise, continuing to read corresponding image files of a component one by one according to layer numbers and transforming
(Continued)

Middle figure frame

Component frame

Synthesis frame obtained component image files into the prescribed format. Adopting this method can implement the synthesis of dynamic virtual figures and thus provide better service for users.

20 Claims, 2 Drawing Sheets

(51) Int. Cl.
    *G06T 1/00*     (2006.01)
    *G06T 13/80*     (2011.01)
    *G06T 13/40*     (2011.01)
    *G06T 13/20*     (2011.01)

(52) U.S. Cl.
    CPC .............. *G06T 13/20* (2013.01); *G06T 13/40* (2013.01); *G06T 2210/32* (2013.01)

(58) Field of Classification Search
    USPC ................................ 345/473–475; 348/42–60
    See application file for complete search history.

(56) References Cited

U.S. PATENT DOCUMENTS

| | | | | |
|---|---|---|---|---|
| 6,323,856 | B1* | 11/2001 | Smilansky et al. | 345/418 |
| 6,377,626 | B1* | 4/2002 | Hatabu | 375/240.1 |
| 6,618,051 | B1* | 9/2003 | Edwards et al. | 345/427 |
| 6,628,283 | B1* | 9/2003 | Gardner | 345/427 |
| 6,864,897 | B2* | 3/2005 | Brand | 345/582 |
| 7,570,803 | B2* | 8/2009 | Criminisi et al. | 382/154 |
| 7,706,663 | B2* | 4/2010 | Huang | G11B 27/034 386/343 |
| 8,970,854 | B2* | 3/2015 | Kajikawa | H04N 1/00233 358/1.12 |
| 2001/0016829 | A1* | 8/2001 | Toshikage et al. | 705/26 |
| 2002/0051207 | A1* | 5/2002 | Ohkubo et al. | 358/1.18 |
| 2002/0063777 | A1* | 5/2002 | Maekawa et al. | 348/143 |
| 2002/0105529 | A1* | 8/2002 | Bowser et al. | 345/629 |
| 2002/0181586 | A1* | 12/2002 | Kondo et al. | 375/240.08 |
| 2003/0058939 | A1* | 3/2003 | Lee | H04N 7/147 375/240.08 |
| 2003/0128235 | A1* | 7/2003 | Chernow et al. | 345/744 |
| 2004/0117358 | A1* | 6/2004 | von Kaenel et al. | 707/3 |
| 2004/0120345 | A1* | 6/2004 | Yamaguchi et al. | 370/465 |
| 2005/0195216 | A1* | 9/2005 | Kramer et al. | 345/619 |
| 2009/0089254 | A1* | 4/2009 | Von Kaenel et al. | 707/3 |
| 2011/0205259 | A1* | 8/2011 | Hagood, IV | G09G 3/2003 345/690 |

FOREIGN PATENT DOCUMENTS

| | | |
|---|---|---|
| CN | 1479250 | 3/2004 |
| EP | 0905976 A1 | 3/1999 |
| JP | 2002298149 A | 10/2002 |
| JP | 2004046513 A | 2/2004 |
| KR | 20010082779 A | 8/2001 |
| KR | 20010096412 A | 11/2001 |
| WO | 0064154 A1 | 10/2000 |
| WO | 03/081388 A2 | 10/2003 |

OTHER PUBLICATIONS

Korean Office Action for Korean Application No. 10-2006-7026235, dated Jan. 30, 2008, and English translation thereof.
Korean Office Action for Korean Application No. 10-2006-7026235, dated Jul. 25, 2009, and English translation thereof.
Korean Office Action for Korean Application No. 10-2006-7026235, dated Oct. 24, 2009, and English translation thereof.
Notice of Reasons of Rejection for Japanese Application No. 2007-511833, dated Mar. 24, 2009, and English translation thereof.
Russian Office Action for Russian Application No. 2006143545, dated Oct. 25, 2007, and English translation thereof.
Canadian Office Action for Canadian Patent Application No. 2,566,787, dated Jun. 11, 2010.
Indian Office Action for Indian Patent Application No. 4576/CHENP/2006, dated Sep. 2, 2010.
Canadian Office Action for Canadian Patent Application No. 2,566,787, dated May 22, 2012.
Canadian Office Action for Canadian Patent Application No. 2,566,787, dated Apr. 24, 2013.

* cited by examiner

Middle figure frame

Component frame 1  2  3  4   5  6  7   8 9   10 11   12 13   14

Synthesis frame

METHOD FOR SYNTHESIZING DYNAMIC VIRTUAL FIGURES

FIELD OF THE TECHNOLOGY

The present invention relates to image processing technologies, and more particularly, to a method for synthesizing dynamic virtual figures.

BACKGROUND OF THE INVENTION

Virtual figure is a technology that was developed through the Internet in recent years and a web virtual figure has gradually become a fashion for netizen because it can embody user's individuation and exhibit user's originality, the virtual figure is very popular among the netizen. At present, most of the virtual figures are stored based on an interchangeable image file format Graphic Interchange Format (GIF) and each virtual figure is synthesized by multiple components. The component hereby denotes each component image that synthesizes the virtual figure and was stored in the GIF format and each component is a single-frame GIF image.

The GIF format is a basic standard image file storage format and each GIF file may include a plurality of color images where each color image is called a frame, in other words, a plurality of frames may be stored in each GIF file. The GIF images can be divided into single-frame images and multi-frame images and, generally speaking, the single-frame image appears as a static image while the multi-frame image is displayed one frame after another to represent dynamic effect or animation effect just like a lantern slide projection. However, each frame is different from a single piece of image in that the single frame usually cannot form an image, so one frame in the GIF image must associate with the previous frame therein in order to be represented as a visual image. A GIF image file stores the image-related information with block as the unit and each GIF file includes a block indicating the graphic/image, a sub block and a control information block displaying the graphic/image, which are called a GIF data stream. All the control information blocks and the blocks in the data stream must be located between Header and Trailer. The GIF file format adopts a Lempel-Ziv Walch (LZW) compression algorithm to store the image data and the users are allowed to set transparency attribute for the image background.

Typical structure of a GIF file is shown in table 1.

TABLE 1

| Label | Constituent Name | Description | |
|---|---|---|---|
| 1 | Header | GIF Header | |
| 2 | Logical Screen Descriptor | Logical Screen Description Block | |
| 3 | Global Color Table . . . Extension Module (arbitrarily selected) . . . | Global Color Table | |
| 4 | Image Descriptor | Image Description Block | Repeated |
| 5 | Local Color Table | Local Color Table (which can be repeated for n times) | for N times |
| 6 | Table Based Image Data | Table Based Compressed Image Data | |
| 7 | Graphic Control Extension | Graphic Control Extension Block | |
| 8 | Plain Text Extension | Plain Text Extension Block | |
| 9 | Comment Extension | Comment Extension Block | |

TABLE 1-continued

| Label | Constituent Name | Description |
|---|---|---|
| 10 | Application Extension . . . Extension Module (arbitrarily selected) . . . | Application Extension Block |
| 11 | GIF Trailer | GIF Trailer |

There are three types of blocks in the GIF file: a Control Block, a Graphic-Rendering Block and a Special Purpose Block. Therein, the Control Block includes information for controlling data stream or setting hardware parameters, while elements of the control block include: a GIF Header, a Logical Screen Descriptor, a Graphic Control Extension and a GIF file Trailer. The Graphic-Rendering Block includes information and data for rendering the displayed graphic on the display device, while elements of the graphic descriptor include: an Image Descriptor and a Plain Text Extension. The Special Purpose Block includes information independent of the image processing and elements of the Special Purpose Block include: a Comment Extension and an Application Extension.

Here, the influence scopes of only the Logical Screen Descriptor and the Global Color Table in the Control Block are outside of the data stream, while all the other control blocks only control the Graphic-Rendering Blocks following them. In other words, in table 1, influence scopes of the Logical Screen Descriptor and the Global Color Table are the whole file, while the Application Extension, the Plain Text Extension, the Comment Extension and the Graphic Control Extension only control those Graphic-Rendering Blocks following them.

In table 1, the Logical Screen Descriptor includes parameters defining image display area, including information like a logic screen size, a background color, whether there is the global color table and so on.

Because one GIF file can include a plurality of color images and each color image may have a color table in accordance with this image's characteristics, one GIF file may have several color tables. But there are only two kinds of the color tables in general: the Global Color Table and the Local Color Table. The Global Color Table is applicable for all the images with no color table and the Plain Text Extensions, while the Local Color Table is only applicable for the image following it. The Global Color Table can be inexistent when each frame of the image has a Local Color Table.

The Application Extension includes relevant information about the application program to make up the image file, such as: whether there is a periodic animation display, how many times to periodically play the animation and so on. This block can be left out when the image file is static.

The Graphic Control Extension includes parameters for processing the Graphic-Rendering Block, including: a transparence mark that indicates the existence of transparence, transparence color index, processing method, remaining time and so on. Therein, the processing method is used for specifying the process after the graphic is displayed, for example: a) no process is specified; b) no process is specified and the graphic remains where it is; c) color of the area displaying the graphic must be recovered as the background color; d) displaying the previously displayed graphic. The remaining time, whose unit is 1% second, is used for specifying the waiting time span between the graphic display and subsequent process.

The Image Descriptor is used for recording the size of each frame of the image and may include any number of images with no fixed storage sequence while only a one-byte image separator is used for identifying the Image Descriptor. Each image includes an image descriptor, a dispensable local color table and image data. Each image must be within the logic screen defined by the logical screen descriptor.

The Image data include sub data sequences. The image data record each pixel using the index value of the color table and compress the data by using the LZW algorithm.

SUMMARY OF THE INVENTION

A method for synthesizing dynamic virtual figures is provided, so as to implement synthesis of the dynamic virtual figures and thus provide better service for the user.

To obtain the above-mentioned objectives, technical scheme of the present invention is implemented as follows:

A method for synthesizing dynamic virtual figure, including:

a. a synthesis server end receiving a user request sent by a user and, according to information in the user request, obtaining image files of all the components for synthesizing a virtual figure;

b. reading corresponding image files of a component one by one according to layer numbers and transforming obtained component image files into a prescribed format;

c. synthesizing the component formatted in step b and previously synthesized middle figure;

d. determining whether all the components are synthesized, if all the components are synthesized, writing a synthesized virtual figure into a virtual figure image file; otherwise, returning to step b.

In the method for synthesizing the dynamic virtual figures provided by the present invention, before synthesizing the virtual figures, formats of all the components are unified into a standard format and, during the synthesis process, an insertion manner of frame hold duration is adopted to determine the frame number of the synthesized virtual figure, display hold duration of each frame and the frame in the middle figure to be synthesized with a certain frame in the component, and meanwhile, after the synthesis process, a frame-by-frame contrastive compression algorithm starting from the last frame is adopted. Therefore, synthesis of the dynamic virtual figures is implemented, thereby better service may be provided for the user and the user's satisfaction may increases. In addition, the dynamic virtual figure synthesis technology may bring great incomes for service providers, because a practical survey has indicated that 10% of the netizen expect to synthesize the dynamic virtual figures while over 85% of the netizen greatly expect to synthesize the dynamic virtual figures.

DETAILED DESCRIPTION OF THE INVENTION

Figure 1:
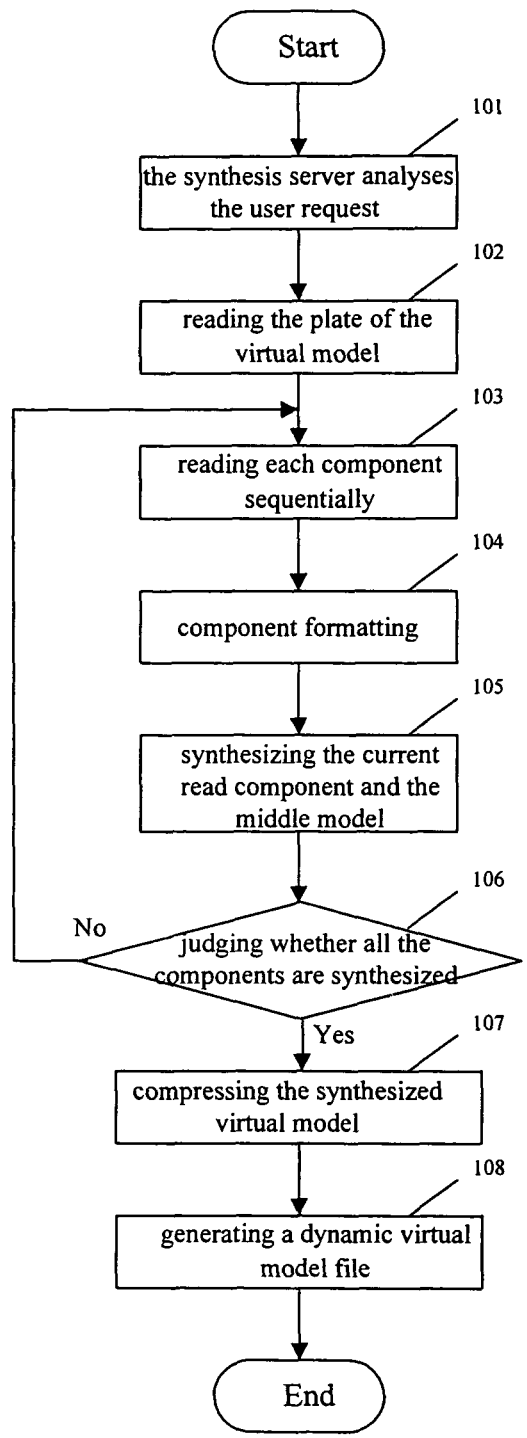
FIG. 1 is a flowchart illustrating the process for implementing the method in accordance with an embodiment of the present invention.

In the prior art, a synthesis software package generally used through the internet, like a GD library, is usually adopted to implement the virtual figure synthesis process. Because the GD library cannot process a multi-frame file in the GIF format and can only process a single-frame GIF file, existing virtual figure synthesis technology can only synthesize the static virtual figure, which is generally called a static virtual figure synthesis. The procedure for implementing the static virtual figure synthesis in the prior art is that: determining contextual relations between the components and defining such contextual relations with layers; when performing the synthesis, firstly synthesizing the first layer and the background image in sequence of layer number, and then synthesizing the second layer and the previously synthesized image, the rest may be deduced by analogy until all the layers are synthesized. For instance, there are three components besides the background, which are trousers, cloth and face, while the final virtual figure is that: the face is in front of the cloth, part of the collar is covered by the face, the cloth is in front of the trouser, namely the cloth covered part of the trouser, then, the predetermined layer numbers are that: the trouser 1, the cloth 2 and the face 3; when the synthesis is performed, the trouser is pasted upon the background at first, and then the cloth is pasted therein while the face is pasted therein finally, the action of paste herein refers to synthesize the images using the existing synthesis functions.

Although the above-described synthesis method is pretty simple and easy to be implemented, because each component is single-frame and each temporary synthesized image is also single-frame, the final synthesized image is also single-frame and static, in other words, only static virtual figure can be obtained by adopting the method above. Even if the synthesis components are multi-frame dynamic GIFs, only the first frame can be read for the synthesis, therefore, the synthesized virtual image is simple and stiff without being able to meet the user's requirement or satisfy the user.

To make the objective, technical scheme and advantages of the present invention clearer and more understandable, the present invention will be described in detail hereinafter with reference to several embodiments.

Key idea of the embodiments of the present invention is that: after reading each component, performing the standard formatting upon the component by adopting a uniform global color table and adopting a uniform frame processing method; and then, according to the hold duration of each frame of the component and that of the middle figure, determining the frame insertion point for the synthesis and fulfilling the synthesis of the component's frame and the middle figure's frame at each insertion point. In addition, after the synthesis, the frame-by-frame contrastive compression manner may be performed starting from the last frame so as to reduce the size of the synthesized dynamic virtual figure.

Because each virtual figure component is a GIF image file, before the synthesis process is started, it is required to label all the components of the virtual figure to be synthesized so that each component is identified by a unique label. Meanwhile, it is needed to determine the layer number of each component according to fore-and-aft order of each component in the virtual figure, while the layer number and the label of each component is independent of each other, during the synthesis, there can be only one component with a certain layer number. Generally speaking, the order from the background to the foreground adopts incremental layer numbers, in other words, the foreground's layer numbers are higher than the background's layer numbers, under such situation, the components with higher layer numbers may cover those with lower layer numbers, for example: a portrait may cover the background, a hand may cover the body and so on.

After the label and the layer number of each component are determined, all the component files are stored in manner of component label and layer number to organize a catalog structure, for example: a car's component label is 4 and the layer number is 20; a flower's component label is 8 and the layer number is 12, and so on, so that it is convenient to read the components while synthesizing the virtual figure.

Generally speaking, the synthesis of virtual figure is triggered and enabled according to the user request, before sending out the request, the user will have known the desired virtual figure to be synthesized includes which components as well as corresponding labels and layer numbers of these components, for example: a user purchases needed components in advance, selects a certain background and a certain cloth to match together. In this way, the user request will carry information of all the components when the user sends out the request, in other words, the user sends his identity information together with information of the components for synthesizing the virtual figure to a network server in manner of, for example: user identity, 1 component label and corresponding layer number, 2 component label and corresponding layer number . . . n component label and corresponding layer number. Hereby, the server for implementing the image synthesis function is called a synthesis server; the user identity may be a registration name or a registration label of corresponding user.

As shown in FIG. 1, the process for implementing the dynamic virtual FIG. synthesis in the embodiment of the present invention includes the following steps:

Step 101: when a user requires to synthesize a virtual figure, the user sends a user request, which carries user identity information and component information, to the synthesis server end; the synthesis server analyzes received user request and obtains from the user request the number of components for synthesizing the virtual figure as well as corresponding label and layer number of each component; and then corresponding component image file can be obtained from the component catalog structure according to the component label and corresponding layer number.

Step 102: after determining all the components needed for synthesizing the virtual figure at present, the synthesis server needs to read a virtual figure plate at first and then, according to different layer numbers, synthesizes each component into the plate one by one.

Since each user may select different numbers of components with different layer numbers, a plate has to be applied at the bottom plate of the virtual figure, where the plate is a GIF file generated according to a prescribed format, being either white or transparent image; the plate may also be deemed as the middle virtual figure synthesized previously. Generally speaking, the plate may be automatically added by the synthesis server.

Step 103: after reading the virtual figure's plate, according to the component label and layer number, the synthesis server reads corresponding image files of a component from the component with lower layer number.

The specific process is that: according to the given GIF file format in table 1, the synthesis server reads the GIF file header, the logical screen descriptor, the global color table, the application extension, the graphic control extension, the image descriptor, the image data and so on, if there is a local color table, the synthesis server needs to read the local color table and stores this table into corresponding memory structure. If this component is a dynamic GIF image, the synthesis server has to read a plurality of graphic control extensions, image descriptors and image data to form a multiple-frame image. If each frame has its own local color table, the image color in the frame shall be determined by the local color table instead of being determined by the global color table. Here, one may know whether this component is a dynamic GIF image by judging whether there are multiple frames in the GIF file, if only one of the synthesized component is multiple-frame, the synthesized virtual figure is multiple-frame and dynamic.

Because the comment extension and the plain text extension in the GIF file are useless for synthesizing the virtual figure, in order to reduce the synthesized file's size, the comment extension and the plain text extension can be omitted temporarily while reading the GIF image.

Step 104: the read component image files are uniformed with a prescribed format, in other words, the format initialization is performed.

It can be seen from the description in terms of the graphic control extension in the GIF file format that, three problems make the dynamic GIF image synthesis very difficult: ① in the GIF file, a decoder may perform four kinds of processes upon the displayed frame, which means there are four types of dynamic GIFs, however, a static GIF cannot embody the difference among the four types because the static GIF has only one frame; ② since each frame in the multiple-frame GIF may have its own local color table or may use the colors in the global color table instead of the local color table, such situation may lead to diversification of multi-frame GIF files; ③ since the frame number in the GIF file of each component is different from that of other components, and the display hold duration of each frame is also different from that of others, such situation may also lead to the diversification of multi-frame GIF files.

In terms of the above-mentioned problems, in the embodiments of the present invention, the former two problems can be solved by formatting the component GIF, while the third problem will be solved during the synthesis. The specific formatting method in accordance with the embodiments of the present invention is as follows:

a1. The color tables are unified, namely: adding the colors in the local color table to the global color table, when the color number exceeds the maximum color number of the global color table, the newly added colors will be replaced by the minimum distance colors.

Here, the color distance denotes the quadratic sum of two colors' red values, green values and blue values respectively, and those two colors that have the minimum quadratic sum are called the minimum distance colors.

b1. each frame may turn into an image independently, when a frame has to associate with the previous frame to turn into an image independently, this frame will be associated with the previous one to form an image independently with a unified format, and a processing manner after display in the graphic control extension may be uniformly set as: necessarily restoring color of the area where the graphic is displayed as the background color.

Here, the specific process for synthesizing the current frame with the previous associated one is that: analyzing each pixel point in the current frame and coloring each pixel point over again, if it is transparent, adopting the color of the previous associated frame's corresponding pixel point, otherwise, adopting the color of the current frame's pixel point.

During the formatting process, the colors in the local color table are added to the global color table gradually while each frame is turning into an image independently; each formatted component only has a global color table, each frame therein may turn into a visual image and the processing manner is unique.

Step 105: synthesizing the formatted component and the previously synthesized middle figure. The synthesis in this step may be further divided into two steps:

a2. according to the frame number and each frame's display hold duration of the component and that of the middle figure, determining to synthesize a certain frame in the component and which frame in the middle figure, namely: determining corresponding synthesis relations between the component's frames and the middle figure's frames. Here, the display hold duration of each frame may be obtained from the image control extension of the component image file or that of the middle figure.

Because the component may be dynamic and may have multiple images, and the middle figure may also have multi-frame, furthermore, the display hold duration of the frame images may also be different, in order to synthesize current component and the middle figure, it is necessary to determine in the first place the frame number of the synthesized image and which frame in the middle figure is to be synthesized with a certain frame in current component, namely: determining an insertion point in the first place.

b2. at each insertion point, synthesizing the component's current frame and the middle figure's current frame, namely: pasting the component's current frame to the middle figure's current frame.

During the synthesis process in step a2 and b2, the key is to determine the insertion point according to relevant information of the component's frames and that of the middle figure's frames, and the relevant information hereby means that: number of the component's frames, the display hold duration of each component's frame, number of the middle figure's frames and the display hold duration of each middle figure's frame. The general method for determining the frame insertion point is that:

Firstly, calculating the sum of the display durations of all the frames in the middle figure and, in the mean time, calculating the sum of the display durations of all the frames in the component, and then taking the least common multiple of the two calculated duration sums as the display duration sum of all the frames in the synthesized figure;

Secondly, determining the insertion point number of the component's frame and that of the middle figure's frame according to the display duration of all the component's frames, the display duration sum of all the middle figure's frames as well as the display duration of each frame in the synthesized figure respectively; and then determining the actual insertion point according to the hold duration of each frame respectively. Every time a point is inserted, a frame of the figure being synthesized is generated, and each synthesized frame is generated by pasting a certain frame in the component to an associated frame in the middle figure, while the associated frame in the middle figure denotes the closest middle figure frame among those frames ahead of the current component frame.

To synthesize a frame in the component and the associated frame in the middle figure is to paste the component's current frame at each insertion point to the middle figure's current frame. While the two frames are being synthesized, the colors used by the component's current frame are added to the middle figure's global color table, if the table is full, the colors are replaced by the minimum distance colors.

Figure 2:
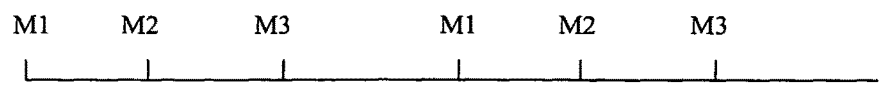
FIG. 2 is a schematic diagram illustrating the process for determining the frame insertion point during the synthesis in an embodiment of the present invention.
Figure 2:
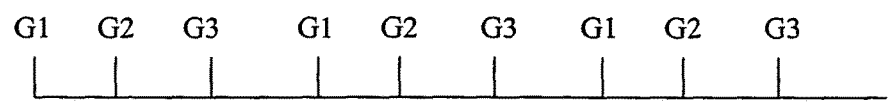

With reference to FIG. 2, supposing that the middle figure has three frames, which are respectively M1, M2 and M3, while durations of the three frames are 40, 50 and 60 respectively, and thus the sum is 150; the component has three frames, which are respectively G1, G2 and G3, while durations of the three frames are 30, 30 and 40 respectively, and thus the sum is 100. Therefore, the least common multiple of the two sums is 300, in other words, the display duration sum of the synthesized virtual figure's frames is 300. Thus, each of the middle figure's frames is inserted twice periodically, so there are 6 insertion points, namely the image is changed for 6 times; while each of the component's frames is inserted for three times periodically, so there are 9 insertion points, namely the image is changed for 9 times. Because the first insertion point of the middle figure and that of the component are coincident with each other, namely their first frames are coincident, while the rest of the insertion points are not coincident, so there are 14 insertion points altogether and thus 14 synthesized frames are formed, and the practical corresponding insertion point positions are shown in FIG. 2 from 1 to 14.

After the synthesized frame number and the hold durations are determined, the frames are synthesized, where each frame is obtained by synthesizing a frame in the component and the associated frame in the middle figure, and the associated frame is determined according to the frame insertion time, and each synthesized frame is obtained by synthesizing the component's frame, which is the closest to or coincident with the synthesized frame's insertion time point, and the middle figure's frame, which is the closest to or coincident with the synthesized frame's insertion time point. The synthesizing method is still to paste a frame of the component to the corresponding frame of the middle figure, if there are any coincident frames, the two coincident frames will be synthesized into one frame. As shown in FIG. 2, the newly synthesized first frame is obtained by pasting the component's G1 frame to the middle figure's M1 frame, the newly synthesized second frame is obtained by pasting the component's G2 frame to the middle figure's M1 frame, the newly synthesized third frame is obtained by pasting the component's G2 frame to the middle figure's M2 frame, the newly synthesized fourth frame is obtained by pasting the component's G3 frame to the middle figure's M2 frame, the newly synthesized fifth frame is obtained by pasting the component's G3 frame to the middle figure's M3 frame, the newly synthesized sixth frame is obtained by pasting the component's G1 frame to the middle figure's M3 frame, the newly synthesized seventh frame is obtained by pasting the component's G2 frame to the middle figure's M3 frame . . . , and the rest may be deduced by analogy. Here, the newly synthesized first frame is the synthesized frame 1 as shown in FIG. 2, and the rest frames may be deduced by analogy.

The process of pasting is performed according to the following method: while the synthesis is being performed, every pixel point in a certain frame of the component is analyzed: if this pixel is transparent, color of the synthesized frame's corresponding pixel point is the same as that of corresponding pixel point of the middle figure's associated frame, if this pixel is not transparent, there may be three processing manners: A) looking up the global color table of the middle figure for an equivalent color and marking this synthesized frame's corresponding pixel point with this equivalent color; B) if there is no such equivalent color, judging whether the middle figure's global color table is full, if the middle figure's global color table is not full, filling the middle figure's global color table with the color of the corresponding pixel point of a certain frame in the component, and marking this synthesized frame's corresponding pixel point with this color; C) if the middle figure's color table is fully filled, looking up the middle figure's global color table to find a minimum distance color and marking this synthesized frame's corresponding pixel point with this color.

In order to reduce the synthesized file's size, to determine the hold duration sum of the synthesized frame, the larger value of the component's hold duration sum and the middle figure's hold duration sum can be adopted instead of the above-mentioned least common multiple. Still with reference to FIG. 2, the component frame number is 3, the durations are 40, 50 and 60 respectively, and the duration sum is 150; the middle figure frame number is 3, the durations are 30, 30 and 40 respectively, and the duration sum is 100; so the maximum value of the component's hold duration sum and the middle figure's hold duration sum is 150. It can be seen from FIG. 2 that, if the periodic circle is set as 150, the display hold duration of the middle figure will be terminated at M3, namely at the second M1; as to the component, the duration will be terminated between the second G2 and G3, therefore, only 7 frames need to be synthesized accordingly, namely frame 1 to frame 7 shown in FIG. 2 needs to be synthesized. Therein, the synthesized frame 1 is obtained by pasting the component's G1 frame to the middle figure's M1 frame, the synthesized frame 2 is obtained by pasting the component's G2 frame to the middle figure's M1 frame, the synthesized frame 3 is obtained by pasting the component's G2 frame to the middle figure's M2 frame, . . . , and the rest may be deduced by analogy. Such process can reduce the synthesized figure file's size while the user's feeling is slightly affected.

When display hold durations of the middle figure's frames and that of the component's frames are unified, the hold duration insertion algorithm can be frame number least common multiple method alternatively, namely: the least common multiple of the component's frame number and the middle figure's frame number is taken as the synthesized figure's frame number, for example: the component's frame number is 3 and the hold durations therein are all 50; the middle figure's frame number is 4 and the hold durations therein are all 50, so the least common multiple of the component's frame number and the middle figure's frame number is 12, in other words, it is determined that the component's frames are inserted for four times periodically, while the middle figure's frames are inserted for three times periodically.

If display hold durations of the middle figure's frames and that of the component's frames are unified, and the component's frame number and the middle figure's frame number are both the power of 2, the hold duration insertion algorithm can be further transformed by taking the larger value of the component's frame number and the middle figure's frame number. For example, the component's frame number is 2 and the hold durations therein are both 50; the middle figure's frame number is 4 and the hold durations therein are all 50, so it is determined that the component's frames are inserted twice periodically, while the middle figure's frames are inserted only once.

Step 106: the newly synthesized virtual figure is taken as the middle figure, and then it is judged whether all the components requested by the user are all synthesized, if all the components requested by the user are all synthesized, step 107 is executed; otherwise, step 103 is executed, where the component image file of the next layer is read in sequence of the layer number for process and synthesis. Such process will be repeated until all the components selected by the user are synthesized to obtain the dynamic virtual figure required by the user.

Step 107: since each frame in the synthesized dynamic GIF can form an image independently, the file is relatively large, so the synthesized virtual figure needs to be compressed in order to reduce the storage space.

According to the description in step 104: the synthesized virtual figure only has a global color table and the colors are determined as the same if corresponding pixel point values in the frame are the same, so the following compression algorithm can be adopted specifically: an unused color is selected as the transparent color and the following step starts from the last frame, the pixel point value of current frame is compared with that of the previous frame, if the two values are the same, this point will be changed into the transparent color, and the rest may be deduced by analogy until the second frame is compressed through comparison; the processing manners after display of all the frames are unified as no process, so the graphic will stay unmoved. After this compression algorithm is performed, each frame only records those pixels that are different from the previous frames' pixels. Size of the virtual figure file compressed by this compression algorithm will be greatly reduced, like from several hundred K to less than one hundred K.

Step 108: the GIF file header, the logic screen descriptor, the global color table and the application extension in the memory structure, which are used to synthesize the virtual figure, are wrote into the virtual figure GIF file respectively in the format of the GIF file, and then the graphic control extension, the image descriptor and the image data of each frame are wrote into the virtual figure GIF file respectively, and finally a GIF Trailer is added. Therein, the image data are wrote into the virtual figure GIF file in manner of the LZW compression.

Whether to compress the synthesized virtual figure can be determined according to specific requirement, if there is no requirement for compression, the synthesized virtual figure may be directly wrote into the virtual figure image file frame by frame; if the compressing process is required, step 107 and 108 may be executed.

After the above steps are executed, the final synthesized dynamic virtual figure is multi-frame, each frame and the previous associated frame form an image together and dynamic effect can be obtained by periodically displaying these images.

The above descriptions are just preferable embodiments of the present invention and not necessarily used to limit the protection scope of the present invention.

The invention claimed is:

1. A method for synthesizing dynamic virtual figure, comprising:
   a. a synthesis server end receiving a user request sent by a user and, according to information in the user request, obtaining image files of all the components for synthesizing a virtual figure;
   b. reading corresponding image files of a component one by one according to layer numbers and transforming obtained component image files into a prescribed format;
   c. synthesizing the component formatted in step b and a previously synthesized middle figure;
   d. determining whether all the components are synthesized, if all the components are synthesized, writing a synthesized virtual figure into a virtual figure image file; otherwise, returning to step b;
   wherein, step c comprises:
   determining synthesized image frame number of the middle figure and that of the formatted component, display hold duration of each frame and a corresponding synthesis relation between the component's frames and the middle figure's frames, in terms of the determined corresponding synthesis relation and according to the display hold duration of each frame, synthesizing frames of the component and corresponding frames of the middle figure.

2. The method of claim 1, wherein, before reading all the component image files, further comprising: reading a plate file.

3. The method of claim 1, wherein, before writing the synthesized virtual figure into the virtual figure image file frame by frame in step d, the method further comprising:
compressing the image file corresponding to the synthesized virtual figure frame by frame from the last frame to the second one, thus the step of writing the synthesized virtual figure into the virtual figure image file being:
writing each frame corresponding to the compressed and synthesized virtual figure into the virtual figure image file.

4. The method of claim 3, wherein, the compressing hereby specifically comprises:
comparing pixel value of frame with that of the previous frame point by point, and if the two pixel values are the same, changing color of the point into transparence; if the two pixel values are different, no process being performed.

5. The method of claim 1, further comprising:
pre-obtaining information of all the components of the virtual figure to be synthesized; and
the step a comprises:
the user sending the user request carrying user's identity information and component information for synthesizing the virtual figure to the synthesis server end; the synthesis server end obtaining the component labels and corresponding layer numbers of all the components by analyzing the user request and obtaining corresponding component image files according to the obtained component labels and corresponding layer numbers.

6. The method of claim 5, wherein, the component information at least comprises:
the component label that uniquely identifies the component and corresponding layer number of the component.

7. The method of claim 1, further comprising:
pre-obtaining information of all the components of the virtual figure to be synthesized; and
the step a comprises:
the user sending the user request carrying user's identity information and component information for synthesizing the virtual figure to the synthesis server end; the synthesis server end obtaining the component labels and corresponding layer numbers of all the components by analyzing the user request and obtaining corresponding component image files according to the obtained component labels and corresponding layer numbers.

8. The method of claim 1, further comprising:
obtaining the display hold duration of each frame from the image control extension in the component image file or middle figure image file.

9. The method of claim 1, wherein, transforming the component image files into the prescribed format specifically comprises:
b11. adding colors in the local color table of the component image file to the global color table, and judging whether the global color table exceeds the maximum color number, if the global color table exceeds the maximum color number, calculating the minimum distance color and adding the calculated minimum distance color to the global color table, otherwise, directly adding the colors in the local color table to the global color table;
b12. judging whether each pixel point of the frame is transparent, if each pixel point of the frame is transparent, adopting the color of the pixel point corresponding to the frame's previous associated frame, otherwise, adopting the color of the frame's pixel point;
b13. setting a processing manner after display in a graphic control extension in the component image file uniformly as: restoring color of the area where the graphic is displayed as background color necessarily.

10. The method of claim 1, further comprising:
obtaining the display hold duration of each frame from the image control extension in the component image file or middle figure image file.

11. The method of claim 1, wherein, synthesizing the component's frames and the middle figure's corresponding frames according to the display hold duration of each frame in step c comprises:
c11. calculating sum of the display durations of all the frames in the middle figure and, in the mean time, calculating sum of the display durations of all the frames in the component, and taking the least common multiple of the two calculated display duration sums as the display duration sum of all the frames in the synthesized figure;
c12. determining a frame insertion point according to the number of the component's frames and the display hold duration of each frame therein, the number of the middle figure frames and the display hold duration of each frame therein, as well as the display duration sum of all the frames obtained in step c;
c13. synthesizing the component's frame and the middle figure's frame at each insertion point.

12. The method of claim 11, wherein, the synthesizing in step c further comprises:
c1. analyzing each pixel point of the frame in the component, judging whether color of the pixel point is transparent, if color of the pixel point is transparent, which means that corresponding pixel point color of the synthesized frame is the same as the corresponding pixel point color of the middle figure's associated frame, returning to step c1 and continuing to process the next pixel point, otherwise, executing step c2;
c2. judging whether there is a color in the middle figure's global color table that is equivalent to the pixel point's color, if there is a color in the middle figure's global color table that is equivalent to the pixel point's color, marking corresponding pixel point of the synthesized frame using the equivalent color, returning to step c1 and continuing to process the next pixel point; otherwise, executing step c3;
c3. judging whether the global color table of the middle figure is fully filled, if the global color table of the middle figure has not been fully filled, filling the global color table of the middle figure with corresponding pixel point color of the frame in the component, and marking corresponding pixel point of the synthesized frame with the color; if the global color table of the middle figure is fully filled, looking up the global color table of the middle figure for a minimum distance color and marking corresponding pixel point of the synthesized frame with the color.

13. The method of claim 1, wherein, synthesizing the corresponding frames of the component and that of the middle figure according to the display hold duration of each frame therein in step c further comprises:
   c21. calculating the sum of the display durations of all the frames in the middle figure and, in the mean time, calculating the sum of the display durations of all the frames in the component, and taking the larger value of the component's hold duration sum and the middle figure's hold duration sum;
   c22. determining a frame insertion point according to the display hold duration of each frame in the component, the display hold duration of each frame in the middle figure, as well as the larger value of the component's hold duration sum and the middle figure's hold duration sum;
   c23. synthesizing the component's frame and the middle figure's frame at each insertion point.

14. The method of claim 13, wherein, the synthesizing in step c further comprises:
   c1. analyzing each pixel point of the frame in the component, judging whether color of the pixel point is transparent, if color of the pixel point is transparent, which means that corresponding pixel point color of the synthesized frame is the same as the corresponding pixel point color of the middle figure's associated frame, returning to step c1 and continuing to process the next pixel point, otherwise, executing step c2;
   c2. judging whether there is a color in the middle figure's global color table that is equivalent to the pixel point's color, if there is a color in the middle figure's global color table that is equivalent to the pixel point's color, marking corresponding pixel point of the synthesized frame using the equivalent color, returning to step c1 and continuing to process the next pixel point; otherwise, executing step c3;
   c3. judging whether the global color table of the middle figure is fully filled, if the global color table of the middle figure has not been fully filled, filling the global color table of the middle figure with corresponding pixel point color of the frame in the component, and marking corresponding pixel point of the synthesized frame with the color; if the global color table of the middle figure is fully filled, looking up the global color table of the middle figure for a minimum distance color and marking corresponding pixel point of the synthesized frame with the color.

15. The method of claim 1, wherein, when the display hold duration of each frame in the middle figure is uniform with that in the component, synthesizing the corresponding frames of the component and that of the middle figure according to the display hold duration of each frame therein in step c further comprises:
   c31. calculating the least common multiple of the component frame number and the middle figure frame number;
   c32. determining a frame insertion point according to the component frame number, middle figure frame number and the least common multiple of the component frame number and the middle figure frame number;
   c33. synthesizing the component's frame and the middle figure's frame at each insertion point.

16. The method of claim 15, wherein, the synthesizing in step c further comprises:
   c1. analyzing each pixel point of the frame in the component, judging whether color of the pixel point is transparent, if color of the pixel point is transparent, which means that corresponding pixel point color of the synthesized frame is the same as the corresponding pixel point color of the middle figure's associated frame, returning to step c1 and continuing to process the next pixel point, otherwise, executing step c2;
   c2. judging whether there is a color in the middle figure's global color table that is equivalent to the pixel point's color, if there is a color in the middle figure's global color table that is equivalent to the pixel point's color, marking corresponding pixel point of the synthesized frame using the equivalent color, returning to step c1 and continuing to process the next pixel point; otherwise, executing step c3;
   c3. judging whether the global color table of the middle figure is fully filled, if the global color table of the middle figure has not been fully filled, filling the global color table of the middle figure with corresponding pixel point color of the frame in the component, and marking corresponding pixel point of the synthesized frame with the color; if the global color table of the middle figure is fully filled, looking up the global color table of the middle figure for a minimum distance color and marking corresponding pixel point of the synthesized frame with the color.

17. The method of claim 1, wherein, when the display hold durations of the middle figure's frames and that of the component's frames are uniform, and the component's frame number and the middle figure's frame number are both the power of 2, synthesizing the corresponding frames of the component and that of the middle figure according to the display hold duration of each frame therein in step c further comprises:
   c41. taking the larger value of the component frame number and the middle figure frame number;
   c42. determining a frame insertion point according to the component frame number, the middle figure frame number and the larger value of the component frame number and the middle figure frame number;
   c43. synthesizing the component's frame and the middle figure's frame at each insertion point.

18. The method of claim 17, wherein, the synthesizing in step c further comprises:
   c1. analyzing each pixel point of the frame in the component, judging whether color of the pixel point is transparent, if color of the pixel point is transparent, which means that corresponding pixel point color of the synthesized frame is the same as the corresponding pixel point color of the middle figure's associated frame, returning to step c1 and continuing to process the next pixel point, otherwise, executing step c2;
   c2. judging whether there is a color in the middle figure's global color table that is equivalent to the pixel point's color, if there is a color in the middle figure's global color table that is equivalent to the pixel point's color, marking corresponding pixel point of the synthesized frame using the equivalent color, returning to step c1 and continuing to process the next pixel point; otherwise, executing step c3;
   c3. judging whether the global color table of the middle figure is fully filled, if the global color table of the middle figure has not been fully filled, filling the global color table of the middle figure with corresponding pixel point color of the frame in the component, and marking corresponding pixel point of the synthesized frame with the color; if the global color table of the middle figure is fully filled, looking up the global color table of the middle figure for a minimum distance color and marking corresponding pixel point of the synthesized frame with the color.

19. The method of claim 1, wherein, the synthesizing in step c further comprises:
- c1. analyzing each pixel point of the frame in the component, judging whether color of the pixel point is transparent, if color of the pixel point is transparent, which means that corresponding pixel point color of the synthesized frame is the same as the corresponding pixel point color of the middle figure's associated frame, returning to step c1 and continuing to process the next pixel point, otherwise, executing step c2;
- c2. judging whether there is a color in the middle figure's global color table that is equivalent to the pixel point's color, if there is a color in the middle figure's global color table that is equivalent to the pixel point's color, marking corresponding pixel point of the synthesized frame using the equivalent color, returning to step c1 and continuing to process the next pixel point; otherwise, executing step c3;
- c3. judging whether the global color table of the middle figure is fully filled, if the global color table of the middle figure has not been fully filled, filling the global color table of the middle figure with corresponding pixel point color of the frame in the component, and marking corresponding pixel point of the synthesized frame with the color; if the global color table of the middle figure is fully filled, looking up the global color table of the middle figure for a minimum distance color and marking corresponding pixel point of the synthesized frame with the color.

20. The method of claim 1, wherein, the image file is an interchangeable Graphic Interchange Format (GIF) file in image file format.

* * * * *